US012430071B2

(12) United States Patent
Bert

(10) Patent No.: US 12,430,071 B2
(45) Date of Patent: Sep. 30, 2025

(54) ADDRESSING ZONE NAMESPACE AND NON-ZONED MEMORY BASED ON DATA CHARACTERISTICS

(71) Applicant: MICRON TECHNOLOGY, INC., Boise, ID (US)

(72) Inventor: Luca Bert, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 11 days.

(21) Appl. No.: 17/893,102

(22) Filed: Aug. 22, 2022

(65) Prior Publication Data

US 2022/0398045 A1 Dec. 15, 2022

Related U.S. Application Data

(63) Continuation of application No. 16/992,728, filed on Aug. 13, 2020, now Pat. No. 11,422,745.

(51) Int. Cl.
*G06F 3/06* (2006.01)
*G06F 12/10* (2016.01)

(52) U.S. Cl.
CPC .......... *G06F 3/0659* (2013.01); *G06F 3/0604* (2013.01); *G06F 3/0679* (2013.01); *G06F 12/10* (2013.01); *G06F 2212/657* (2013.01)

(58) Field of Classification Search
CPC .... G06F 3/0659; G06F 3/0604; G06F 3/0679; G06F 12/10; G06F 2212/657
See application file for complete search history.

(56) References Cited

U.S. PATENT DOCUMENTS

| 9,128,820 | B1 | 9/2015 | Malina | |
|---|---|---|---|---|
| 2005/0246696 | A1* | 11/2005 | Alexander, III | G06F 8/437 717/151 |
| 2007/0033364 | A1* | 2/2007 | Maeda | G06F 3/0613 711/170 |
| 2008/0209114 | A1 | 8/2008 | Chow et al. | |
| 2015/0261465 | A1 | 9/2015 | Joseph et al. | |
| 2020/0089614 | A1 | 3/2020 | Peng et al. | |
| 2020/0133849 | A1 | 4/2020 | Harris et al. | |

FOREIGN PATENT DOCUMENTS

| CN | 104903842 | 9/2015 |
|---|---|---|
| CN | 110874330 | 3/2020 |
| CN | 111164574 | 5/2020 |

\* cited by examiner

*Primary Examiner* — Gary W. Cygiel
(74) *Attorney, Agent, or Firm* — Lowenstein Sandler LLP

(57) ABSTRACT

A memory device comprises a file system and a processing device to perform operations comprising receiving, from the file system, a first data access command comprising a payload, responsive to receiving the first data access command, determining, using the file system, a characteristic of the payload, wherein the characteristic of the payload indicates whether the first data access command is for data or for metadata, and sending a second data access command to a memory sub-system, wherein the second data access command includes an indication of a memory region of a memory device in which the memory sub-system is to store the payload, wherein the indication of the memory region is based on the characteristic of the payload.

20 Claims, 7 Drawing Sheets

ADDRESSING ZONE NAMESPACE AND NON-ZONED MEMORY BASED ON DATA CHARACTERISTICS

REFERENCE TO RELATED APPLICATIONS

The present application is a continuation of application Ser. No. 16/992,728 filed on Aug. 13, 2020, the entire content of which is hereby incorporated by reference.

TECHNICAL FIELD

Embodiments of the disclosure relate generally to memory sub-systems, and more specifically, relate to addressing zone namespace and non-zoned memory based on data characteristics.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
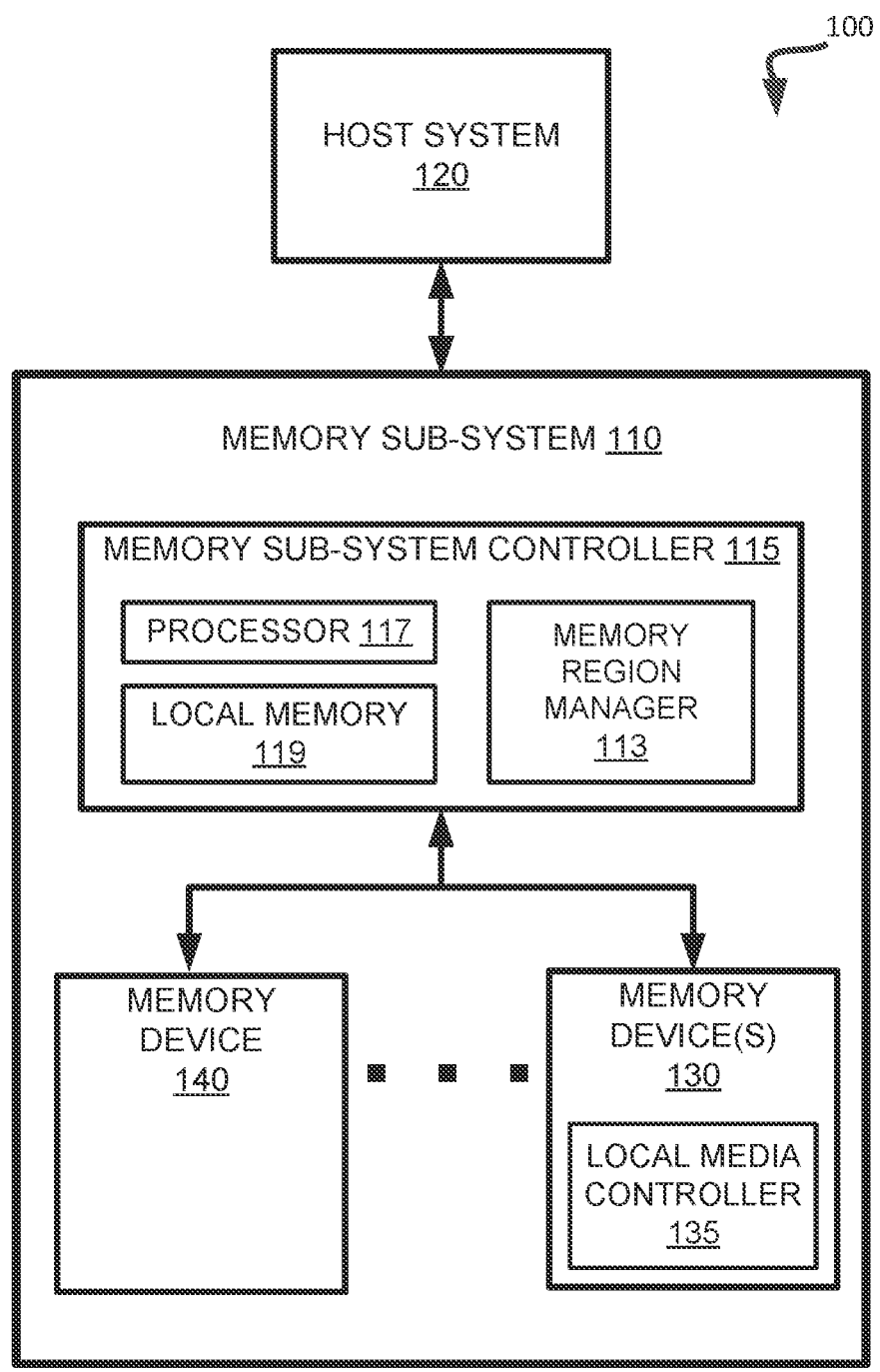
FIG. 1 illustrates an example computing system that includes a memory sub-system in accordance with some embodiments of the present disclosure.

Aspects of the present disclosure are directed to storing data in zone namespace memory or non-zoned memory in accordance with characteristics of the data. A memory sub-system can be a storage device, a memory module, or a combination of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory sub-system can include multiple memory devices to store data from a host system. One example of a non-volatile memory device is a negative-and (NAND) memory device. Other examples of non-volatile memory devices are described below in conjunction with FIG. 1. The memory sub-system includes a memory sub-system controller that can communicate with the memory devices to perform operations such as reading data, writing data, or erasing data at the memory devices and other such operations. A memory sub-system controller is described in greater detail below in conjunction with FIG. 1.

The host system can send access requests (e.g., write commands, read commands) to the memory sub-system, such as to store data on a memory device of the memory sub-system and to read data from the memory device of the memory sub-system. The data to be read or written, as specified by a host request, is referred to as "host data." A host request can include logical address information (e.g., logical block address (LBA), namespace) for the host data, which is the location the host system associates with the host data. The logical address information (e.g., LBA, namespace) can be part of metadata for the host data. The metadata, host data, or both together, can be hereinafter referred to as "payload." Metadata, host data, and parity data, which is used for error correction, can collectively form an error correction code (ECC) codeword. Metadata can also include a data version (e.g., used to distinguish age of data written), valid bitmap (specifying which LBAs or logical transfer units contain valid data), etc.

Each of the memory devices can include one or more arrays of memory cells. A memory cell ("cell") is an electronic circuit that stores information. Depending on the cell type, a cell can store one or more bits of binary information, and has various logic states that correlate to the number of bits being stored. The logic states can be represented by binary values, such as "0" and "1", or combinations of such values. For example, a single-level cell (SLC) can store one bit of information and have two logic states, a multi-level cell (MLC) can store two bits of information and have four logic states, a triple level cell (TLC) can store three bits of information and have eight logic states, In certain implementations, a filesystem can be used as a means to organize the user data on the memory device or devices of the memory sub-system by providing procedures to store, retrieve, and update the data, as well as manage the available space on the memory device or devices. A filesystem organizes data in an efficient manner and can be tuned to the specific characteristics of the memory device. Filesystems are used on various types of data storage devices to maintain the physical locations of computer files. Filesystems generally allocate space in a granular manner, usually using multiple physical units on the memory device. Filesystems are responsible for organizing files and directories, and keeping track of which areas of the device belong to certain files and which are not being used. Filesystems contain data blocks storing the actual data from an application or operating system running on the host system, as well as metadata blocks. This filesystem metadata contains information about the design, structure, and layout of the data structures used to store the actual data. In other implementations, object storage can be used in place of a filesystem. For example, is certain large scale computing implementations, objects can be used in place of a file when the features of those objects are more suitable (e.g., the presence of comprehensive metadata stored with the file eliminating the tiered file structure associated with filesystems).

Shingled Magnetic Recording (SMR) hard disk drives store data in partially-overlapping tracks to increase storage density and thus increase the capacity of the hard disk drives. The overlapping tracks format is used because magnetic write heads cannot be made as narrow as read heads using existing hard disk drive technology (e.g., because reducing the write head to a smaller size would result in the magnetic field produced by the write head being insufficient to change the magnetization of the storage media). When each track is written, the track overlaps a portion of the previously-written track, leaving a remaining portion that can subsequently be read by the read head, but is too narrow to be updated by the write head. Thus, writing to a track overwrites the area of an adjacent track. To avoid overwriting existing data, tracks are grouped into zones, and data written to a zone is appended after the last track of valid data in the zone. Data is written to tracks sequentially within each zone. If data in a valid track is to be modified, all the valid tracks in the zone are read into memory and re-written with the modified data. Thus, SMR hard disk drives have a requirement that write commands write data sequentially (e.g., to sequential physical blocks on the storage media). However, to support existing filesystems that store metadata non-sequentially, SMR hard disk drives can provide features that translate a limited number of non-sequential writes to sequential writes, e.g., by mapping the non-sequential logical block addresses to sequential physical block addresses. This translation can be performed by the hard disk drive controller during idle time between I/O operations. For example, a hard disk drive can perform hundreds (e.g., 200-300) of I/O operations per second, and there is sufficient time for the hard drive controller to translate random writes to sequential writes (e.g., at least 100 microseconds can be available for each I/O operation).

Certain memory devices are also configured with a zone namespace (ZNS). In a zone namespace, the address space of the memory device is divided into zones which allows for more efficient management of data as the capacity of the memory device increases. However host systems designed to work with conventional filesystems can face certain challenges when interacting with a memory device having a zone namespace, however. For example, conventional filesystems can write data in blocks as small as 4 kilobytes (KB) in size, while a zone namespace memory device can have an optimal write size that is in the range of approximately 100 KB (e.g., 64 KB, 128 KB, 196 KB).

Further, zone namespaces do not directly support out-of-order writes, so random writes to zone namespaces are rejected without being performed. Many filesystems utilize a write in place approach (i.e., a random write, also referred to herein as a "non-sequential" write), often with smaller granularity than is optimal for a zone namespace. For example, filesystem metadata is ordinarily written using random writes. In zone namespaces, however, writes are performed sequentially starting from the beginning of each zone. The translation technique performed by SMR hard disk drives is not feasible in solid-state memory devices, which perform far more I/O operations per second and do not have sufficient processing capacity to perform remapping in the time available (e.g., within 1 microsecond). Thus, a zone namespace, though well-suited for storing sequential data for a filesystem such as SMR, does not provide efficient support data written using random writes, such as the filesystem metadata written by an SMR filesystem.

Aspects of the present disclosure address the above and other deficiencies by providing a memory sub-system that efficiently combines a non-zoned namespace for randomly-written data (e.g., metadata) and a zone namespace for sequentially-written data (e.g., "host data") in the same memory sub-system (e.g., SSD). The memory sub-system can support existing filesystems, such as SMR filesystems, by using the non-zoned namespace to store metadata, and using the zone namespace to store host data. The expected size of the metadata is ordinarily a fraction (e.g., less than one percent) of the size of the filesystem's host data, so the size of the non-zoned namespace can be determined based on the size of the zone namespace allocated for the host data. The memory sub-system can direct write commands from the host to the non-zoned namespace or zone namespace based on whether the payload of each write command is metadata or data. The non-zoned namespace, being relatively small, can correspond to a memory region that uses cells (e.g., TLC or SLC) having relatively long program/erase lifetimes suitable for storing metadata, which is more frequently written than the host data. The zone namespace can correspond to a memory region that uses cells (e.g., QLC) that are more economically-suited to storing larger quantities of less-frequently written data, such as the host data.

Advantages of the present disclosure include, but are not limited to, more efficient use of a memory sub-system to provide solid-state storage for a filesystems such as Shingled Magnetic Recording (SMR) filesystems. Existing filesystems designed for use with magnetic disk storage devices need not be modified to accommodate differences between the memory sub-system and magnetic disk storage devices, such as those related to storage of randomly-written metadata while also using zone namespaces that efficiently support sequentially-written metadata. Further, randomly-written metadata can be stored in memory devices that have longer lifetimes, and sequential host data, which is written less frequently, can be stored in memory devices that are more economical but have shorter lifetimes. Thus, aspects of the present disclosure result in memory devices that perform better and last longer.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to multiple memory sub-systems 110 of different types. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130. 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a negative-and (NAND) type flash memory and write-in-place memory, such as a three-dimensional cross-point ("3D cross-point") memory device, which is a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, or electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., a logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which includes a raw memory device 130 having control logic (e.g., local controller 132) on the die and a controller (e.g., memory sub-system controller 115) for media management within the same memory device package. An example of a managed memory device is a managed NAND (MNAND) device.

The memory sub-system 110 includes a memory region manager 113. In one implementation, memory region manager 113 can manage the writing and storing of data across the different regions/portions of memory device 130 and memory device 140. As described above, memory device 130 can include a non-volatile memory device (e.g., NAND). In one embodiment, a first region of memory device 130 is configured with anon-zoned namespace, and a second region of memory device 130 is configured with a zone namespace. The non-zoned namespace can correspond to non-zoned addressable memory region, which can be a portion of memory device 130 not included in the zone namespace. The size of the first region (which corresponds to the non-zoned namespace) storing metadata is relatively small compared to the size of the second region (which corresponds to the zone namespace), and to the total capacity of memory device 130. The first region can include, for example, TLC or SLC memory cells, and the second region can include, for example, QLC memory cells.

The memory region manager 113 can determine in which namespace to store the payload included in a write request. Storing the payload in a namespace causes the payload to be stored in the memory cells of the region configured as the namespace. Thus, for example, storing the payload in the non-zoned namespace causes the payload to be stored in the memory cells of the first region, and storing the payload in the zone namespace causes the payload to be stored in the memory cells of the second region. Although particular namespaces, regions, and memory cells are described in the examples herein, any suitable namespaces, regions, or memory cells can be used. For example, in another implementation, there can be two non-zoned namespaces, one of which corresponds to a region that includes TLC memory cells, and another of which corresponds to a region that includes SLC memory cells, and the memory region manager 113 can determine which of three namespaces (first conventional, second conventional, or zone namespace) to store the payload included in a write request based on characteristics of the payload, such as a size of the payload, as well as a functional designation of the payload. Thus, for example, metadata of a size less than a threshold number of bytes can be stored the first non-zoned region, and metadata of a size greater than a threshold number of bytes can be stored in the second non-zoned region.

In particular embodiments, the memory sub-system controller 115 includes at least a portion of the memory region manager 113. In particular embodiments, the memory region manager 113 is part of the host system 110, an application, or an operating system. In other embodiments, local media controller 135 includes at least a portion of memory region manager 113 and is configured to perform the functionality described herein.

The memory region manager 113 can receive a write command from the host system 120, from memory sub-system controller 115, or from some other component of memory sub-system 110. The write command can include a logical address, a payload, and a tag reflecting a characteristic of the payload. The characteristic can represent either a functional designation of the data in the payload, or an expected frequency of updates of the data in the payload. In one implementation, the source of the write request can be a filesystem, in which case, the tag in the write command can indicate whether the data in the payload is data or metadata. In another implementation, the source of the write request can be a key value store, in which case, the tag in the write command can indicate whether the data in the payload is a key or a value.

Each namespace can be a quantity of one or more memory devices 130-140 that can be formatted into logical blocks (e.g., ranges of LBA space), when memory devices are configured with an NVMe protocol. The NVMe protocol provides access to a single namespace, which appears as a standard-block device on which filesystems and applications can be deployed without any modification. The memory region manager 113 identifies one of the regions (or corresponding namespaces) for each host request (e.g., each read or write request) based on one or more characteristics of the request, such as a tag included in the request, and stores the payload in the identified region (or corresponding namespace).

In particular embodiments, write requests from a host filesystem can be intercepted on the host system by a software framework designed to intercept the write requests and determine certain characteristics of the write requests. The software framework can be, for example, implemented as device mapper operating at the Linux kernel level (e.g., as part of a driver stack), for mapping physical block devices onto higher-level virtual block devices.

The device mapper can determine whether the payload associated with each write command corresponds to metadata or host data by querying the filesystem. The device mapper can then associate a tag with the write command to provide a functional designation of the payload as being either metadata or host data, and send the write command to the storage sub-system (e.g., via a host interface). The storage sub-system, upon receiving the write command, can use the tag to identify the payload's functional designation. If the tag indicates that the payload is metadata, the storage sub-system can write the payload to the non-zoned namespace, or, if the tag indicates that the payload is host data, the storage sub-system can write the payload to the zone namespace. Further, since the non-zoned namespace stores metadata and is a fraction of the size of the zone namespace, the non-zoned namespace can economically include a region of memory in which the physical memory blocks are TLC or SLC NAND memory, which have relatively a relatively long program/erase lifespan. Since the zone namespace stores host data and is expected to be written sequentially (e.g., as in the case of host data stored by an SMR filesystem), the zone namespace can include a region of memory in which the physical memory blocks are QLC NAND memory, which can store large quantities of data more economically than TLC or SLC NAND memory.

Read commands can be processed by the memory sub-system using a data allocation table constructed when the write commands are performed. The data allocation table can include associations between logical block addresses at which payloads are written and the corresponding functional designations of the payloads. Upon receiving a read command, the memory sub-system can determine whether the payload is in the non-zoned namespace or the zone namespace by retrieving the functional designation associated with the logical block address from the data allocation table. For example, if the functional designation of the logical block address is metadata, then the payload is in the non-zoned namespace, and if the functional designation is host data, then the payload is in the zone namespace. The payload can be retrieved from the identified namespace using the logical block address and provided to the host filesystem.

Thus, a memory sub-system can efficiently use a non-zoned namespace for randomly-written data and a zone namespace for sequentially written data to efficiently perform read and write operations for an SMR filesystem or other filesystem that writes data both sequentially and non-sequentially. The zone filesystem can use QLC NAND storage devices for host data to more economically meet the growing required capacities of storage devices, while the conventional filesystem can use NAND storage devices having longer program/erase lifetimes, such as TLC or SLC NAND, for the relatively small amount of metadata stored by the host filesystem for the host data.

Based on the tag introduced above, the memory region manager 113 can identify a region of the memory device 130 for storing the payload. For example, if the tag indicates that the data in the payload is metadata from a file system, the memory region manager 113 can identify the first region of the memory device 130 as the region in which to store the payload. If the tag indicates that the data in the payload is data from a file system, the memory region manager 113 can identify a second region of the memory device 130 as the region in which to store the payload. Similarly, if the tag indicates that the data in the payload is a key from a key value store (KVS), the memory region manager 113 can identify the first region. If the tag indicates that the data in the payload is value from a KVS, the memory region manager 113 can identify the second region.

In one implementation, the tag can indicate that the data in the payload is expected to be updated frequently (e.g., at least once within a specified period of time), in which case the memory region manager 113 can identify the first region as the region in which to store the payload. Alternatively, if the tag indicates that the data in the payload is expected not to be updated frequently, the memory region manager 113 can identify the second region as the region in which to store the payload. The second region can include memory that can be block oriented, and can have a higher latency than the memory of the first region. The memory of the first region can be byte oriented, and can have a smaller capacity than the memory of the second region, which can be high-capacity memory. That is, the lower latency memory of the first region used to store frequently updated data can be a single-level or triple-cell memory, whereas the high capacity memory of the second region used to store less frequently updated data can be a memory with a higher number of bits per cell (e.g., quad-level cell memory).

Once the memory region manager 113 has identified the region (or the corresponding namespace) on which to store the payload, the memory region manager 113 can store the payload in the identified region (or corresponding namespace). The memory region manager 113 can then update a data allocation table to associate the logical address with an indication of the identified region reflecting the location of the payload on the memory device.

Figure 2:
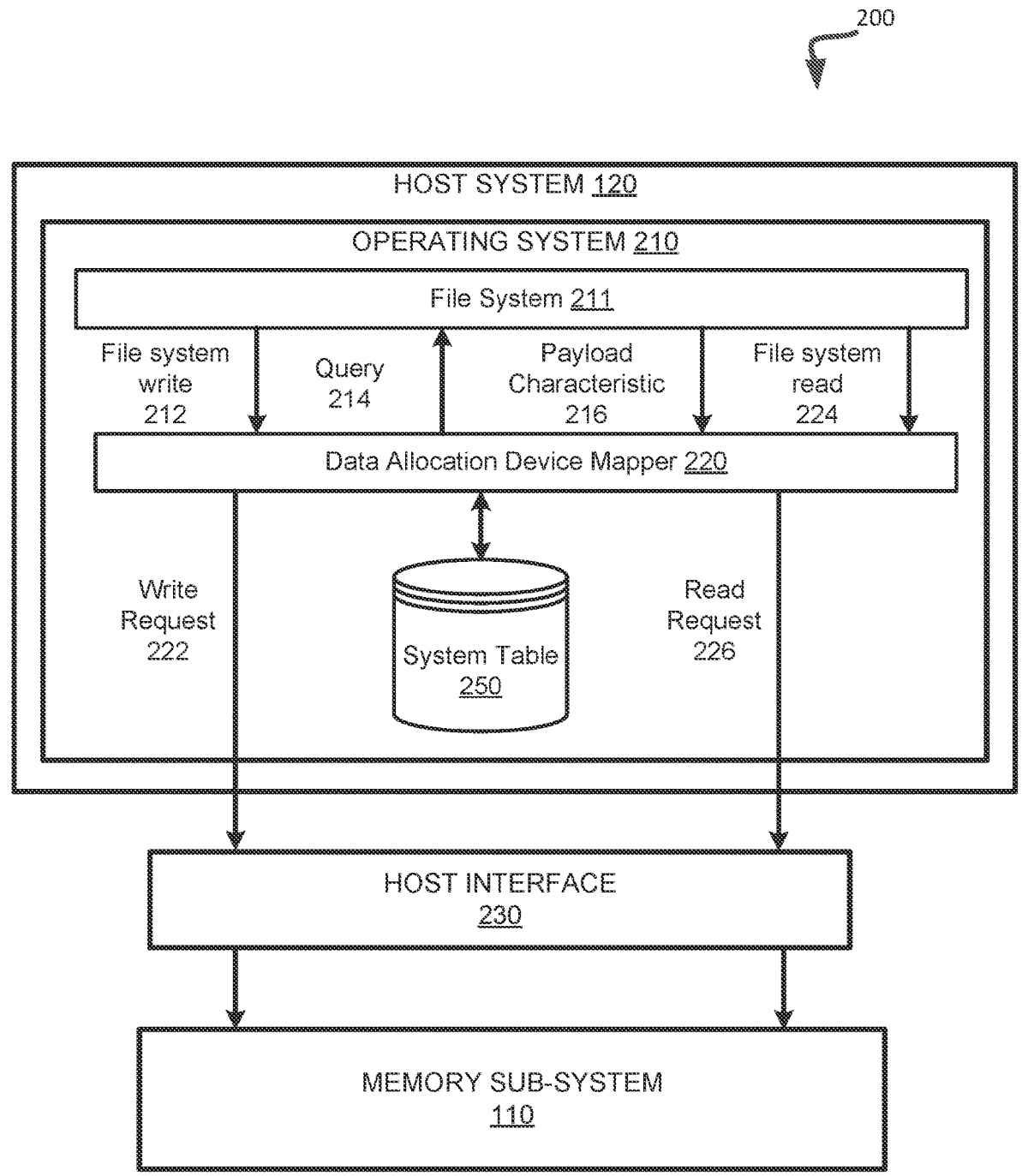
FIG. 2 illustrates a block diagram of an example host system, in accordance with some embodiments of the present disclosure.

FIG. 2 illustrates a block diagram 200 of an example host system, in accordance with some embodiments of the present disclosure. In one implementation, the host system 120 includes an operating system 210, which includes file system 211, a data allocation device mapper 220, and a system table 250. The operating system 210 can also include a key value store or another type of application (not shown). The system table 250 can store descriptors of the data stored by the file system 211, such as information about each file, including the metadata and data. The file system 211 can send a write request 212 that includes a payload. Write requests, also referred to herein as write commands, can be host requests that include a logical address and a payload of data or metadata to be written to a storage sub-system at the logical address.

In particular embodiments, write requests 212 from a host filesystem can be intercepted on the host system 120 by a software framework designed to intercept the write requests and determine certain characteristics of the write requests. The software framework can be, for example, implemented as device mapper 220 operating at the Linux kernel level (e.g., as part of a driver stack), for mapping physical block devices onto higher-level virtual block devices. The device mapper 220 can pass information from the virtual block devices to the memory sub-system. In some implementations, the software framework can be implemented at the kernel space level or at the user space level.

In certain implementations, the device mapper 220 can intercept write commands 212 issued by a file system 211, or from a key value store (KVS). In a filesystem 211, for example, write requests from the host system 120 can be either for data or metadata. A write request from the host system 120 for data can contain actual data from an application or operating system 210 running on the host system, whereas a write request for metadata can contain information about the design, structure, and layout of the data structures used to store the actual data. Data write requests tend to be larger in size than metadata, and are expected to be stored with minimal updates for a longer period of time. Metadata write requests tend to be smaller than data writes, and are expected to be updated frequently. Metadata should also be consistent, and hence other I/O operations can be paused while metadata is being written. As such, the metadata write request are expected to be executed quickly with low latency. The device mapper can determine, based on the system tables 250 of the filesystem 211, for example, whether the write command 212 is for data or for metadata. The system tables 250 can store descriptors of the data stored by the filesystem. The device mapper 220 can search the system tables 250 to identify the descriptors associated with the data specified in the write request, for example whether the data specified in the write request is for metadata or data. The device mapper 220 can then indicate a characteristic of the write command, such as a functional designation of the payload, or an expected frequency of updates of the payload. For example, the device mapper 220 can determine whether the payload represents metadata or data. The device mapper can then associate a tag reflecting this characteristic with the write command.

In particular embodiments, the data allocation device mapper 220 can intercept the write request 212. The data allocation device mapper 220 can identify characteristics about the payload using the system table 250. For example, the data allocation device mapper 220 can send a query 214 to the filesystem 211 determine a characteristic of the payload, such as whether the payload is data or metadata. The filesystem 211 can provide a payload characteristic 216, such as a functional designation indicating whether the payload is data or metadata, to the data allocation device mapper 220 in response to the query 214. As another example, the filesystem 211 can send a read request 224 that includes a logical address of a previously-stored payload to retrieve the previously-stored payload. The data allocation device mapper 220 can intercept the read request 224, though in this example the data allocation device mapper 220 does not identify a payload characteristic for the read request, since the payload is not provided with the read request 224. In another example, the data allocation device mapper 220 can determine whether the payload is a key or a value in a key value store.

Once it has determined the characteristics of the payload, the data allocation device mapper 220 can attach an attribute describing the characteristics of the payload to the write request. In one implementation, a tag, which reflects the characteristic of the payload, is associated with the write request. The data allocation device mapper 220 can set the value of a field in a driver stack. For example, Linux driver stacks have a streamID field that the data allocation device mapper 220 can use as a tag to indicate the characteristic of the payload. Linux drivers are programmed to reserve and preserve the StreamID field. That is, once set, the StreamID tag will not be disturbed as the command is passed through the block level and NVMe driver, for example. Hence in some implementations, the device mapper can set the StreamID tag to specify the type of data in the write command, and can then forward the write command, along with the StreamID, to the memory sub-system. In the filesystem example, setting the streamID to zero can indicate that the payload is for data, and setting the streamID to one can indicate that the payload is for metadata. In the key value store example, setting the streamID to zero can indicate that the payload is for a value, and setting the streamID to one can indicate that the payload is for a key. There may be other ways to associate a tag with the write request to reflect the characteristic of the payload. The data allocation device mapper 220 or other component of the operating system 210 can send a write request 222, based on the write request 212, that includes the attribute describing the characteristic of the payload to the memory sub-system 110 via a host interface 230. The data allocation device mapper 220 can send a read request 226 based on the read request 224 to the memory sub-system 110 via the host interface 230.

Figure 3:
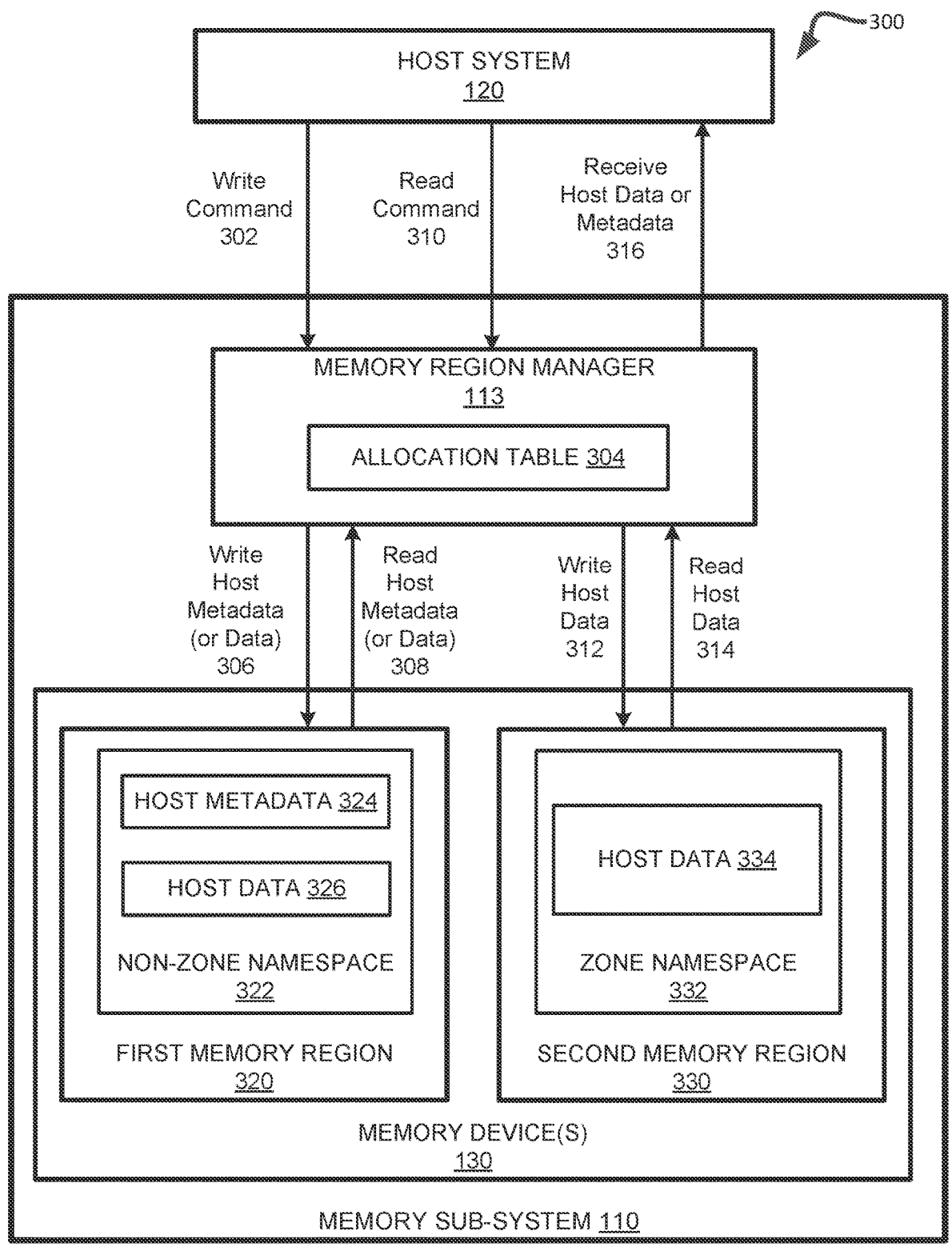
FIG. 3 illustrates a block diagram of an example memory sub-system, in accordance with some embodiments of the present disclosure.

FIG. 3 illustrates a block diagram 300 of an example memory sub-system 110, including a memory region manager 113, in accordance with some embodiments of the present disclosure. The memory region manager 113 can store a data allocation table 304, which can associate logical addresses with functional designations or other identifiers reflecting the location of data on memory devices. In one embodiment, the allocation table 304 can be stored in local memory 119 of FIG. 1. The memory sub-system 110 also includes the memory device(s) 130 described above with reference to FIG. 1. The memory device 130 can include a first memory region 320, which can include a set of physical memory blocks that correspond to logical memory blocks of a non-zone namespace 322 (e.g., a non-zoned namespace as described above). The memory device 130 can also include a second memory region 330, which can include a set of physical memory blocks that correspond to logical memory blocks of a zone namespace 332.

In one embodiment, the memory region manager 113 can receive a write command 302 specifying a logical address, a tag, and a payload from the host system 120. The memory region manager 113 can identify, based on the tag, a region of memory device 130 in which to store the payload. The tag can represent a characteristic of the payload, such as a functional designation of the data in the payload, or an expected frequency of updates of the data. For example, the tag can indicate whether the payload represents metadata or data, or a key or value. In another example, the tag can indicate whether the data in the payload is expected to be updated frequently, e.g. at least once within a specified period of time (such as metadata might be), or whether the data is expected to be stored long-term with fewer expected updates. As an example, data that is frequently updated can be updated once every second, while data that is updates less frequently can be updated once every 30 seconds.

In particular embodiments, the memory region manager 113 can determine, based on the tag, in which of the memory regions 320, 330 of the memory device 130 to store the payload. If the tag indicates that the payload is for metadata (or a key of a key-value pair, or that it expects to be frequently updated), the memory region manager 113 can determine that the identified memory region in which the payload is to be stored is the first memory region 320. As an example, the first memory region 320 can include relatively smaller-capacity memory with low latency (such as TLC or SLC NAND). Alternatively, if the tag indicates that the payload is for data (or a value of a key-value pair, or that it expects to be stored long term), the memory region manager 113 can determine that the identified memory region in which the payload is to be stored is the second memory region 330. As an example, the second memory region 330 can include larger-capacity, less performance-dependent, memory (such as QLC NAND). The larger-capacity memory device can be block oriented, and can have a higher latency than the low latency memory device. Additionally, the low latency memory device can be byte oriented, and can have a smaller capacity than the high capacity memory device. That is, the lower latency memory device used to store frequently updated data can be single-level or triple-level cell memory, whereas the high capacity memory device used to store less frequently updated data can be memory with a higher number of bits per cell (e.g., quad-level cell memory). The identified memory region can be configured as a corresponding namespace. For example, the first memory region 320 can be configured as a non-zone (e.g., conventional) namespace 322, and the second memory region 330 can be configured as a zone namespace 332. Because of the correspondence between the memory regions 320, 330 and the namespaces 322, 332, either the memory regions 320, 330 or the namespaces 322, 332 can be used to address the memory in the regions 320, 330.

If the identified region is the first memory region 320, then the memory region manager 113 can write the payload to the first memory region 320 (arrow 306). In this case, the payload is stored as host metadata 324 in the first memory region 320 at a location based on the specified logical block address (which can be converted to a physical block address by the memory sub-system 110). Alternatively, if the identified region is the second memory region 330, then the memory region manager 113 can write the payload to the second memory region 320 (arrow 312). In this case, the payload is stored as host data 334 in the second memory region 330 at a location based on the specified logical block address (which can be converted to a physical block address by the memory sub-system 110). In another example, there can be multiple zone namespaces, and if the identified region is the second memory region 330, then the payload can be stored in a zone namespace specified by a namespace identifier in the logical address of the write command 302. That is, the destination zone namespace can be a different namespace from the zone namespace 332, which can be understood as a default zone namespace 332 that can be overridden by a zone namespace specified in the logical address of the write command 302.

In another example, since the first memory region can store host data 326 in addition to host metadata 324, the write command 302 can include host data that is stored in the first memory region 320 by the memory region manager 113 (e.g., based on a characteristic other than the functional designation, since the payload having a functional designation of host data is stored in the second memory region 330.

The memory region manager 113 can update the data allocation table 304 by associating the logical address in the write command 302 with the tag (e.g., functional designation) from the write command 302 or other indication of the identified region to which the payload is written. The indication of the region can be, for example, an identifier associated with the identified region (e.g., "1" or "2"), an identifier associated with the identified namespace (e.g., "Non-Zoned" or "Zone"), or the characteristic of the payload (e.g., a designation of "metadata" or "data").

In one embodiment, the memory region manager 113 can receive a read command 310 specifying a logical address from the host system 120. The memory region manager 113 can identify, based on the logical address, a region of memory device 130 from which to retrieve the data requested by the read command. The memory region manager 113 can retrieve an indication of the region in which the requested data is located from the data allocation table 304, e.g., by searching the data allocation table 304 for the logical address specified in the read command 310. If the data was stored at the logical address by the memory region manager 113, the indication of the data in which the region was stored is associated with the logical address in the allocation table. The memory region manager 113 can retrieve the data by identifying which of the memory regions 320, 330 corresponds to the indication of the region. For example, if the indication of the region is a region identifier such as "1" or "2", the corresponding region can be identified based on the region identifier. As another example, if the indication of the region is a namespace identifier (e.g., "Non-Zoned" or "Zone"), a corresponding one of the namespaces 322, 332 can be identified based on the namespace identifier. As still another example, if the indication of the region is a characteristic of the payload (e.g., a designation of "metadata" or "data"), a corresponding one of the regions 320, 330 (or namespaces 322, 332) can be identified based on the characteristic of the payload (e.g., the first memory region 320 corresponds to the designation "metadata" and the second memory region 330 corresponds to the designation "host data").

The memory region manager 113 can retrieve the data from the logical block address portion of the logical address of the identified one of the memory regions 320, 330 (or the identified one of the namespaces, 322, 332 that correspond to the respective regions 320, 330). If the identified region is the first memory region 320, then the memory region manager 113 can retrieve the host metadata 324 at the specified logical block address from the first memory region 320 (arrow 308) and send the retrieved host metadata 324 to the host system 120 (arrow 316). Alternatively, of the identified region is the second memory region 330, then the memory region manager 113 can retrieve the host data 334 at the specified logical block address from the second memory region 330 (arrow 314) and send the retrieved host data 334 to the host system 120 (arrow 316). In another example, since the first memory region can store host data 326 in addition to host metadata 324, the first memory region can contain host data 326 at the specified logical block address, in which case the host data 326 can be retrieved from the first memory region 320 (arrow 308) and returned to the host system 120 (arrow 316).

Figure 4:
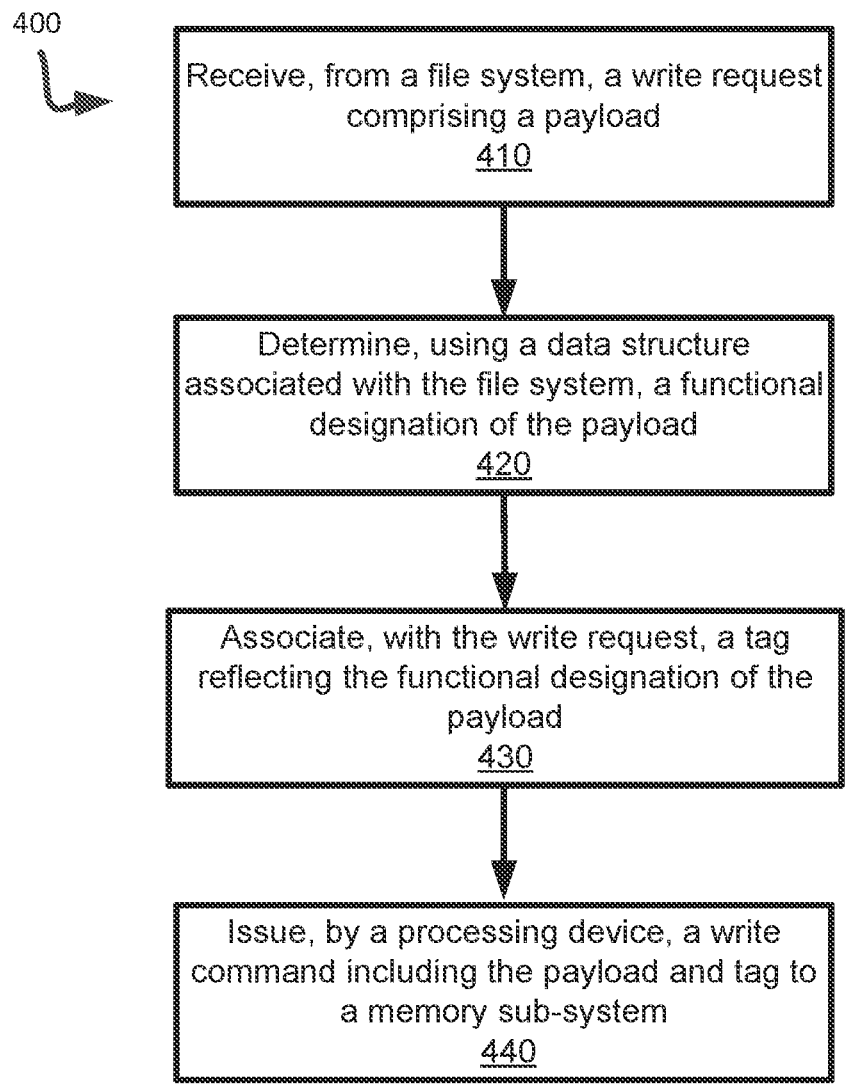
FIG. 4 is a flow diagram of an example method to tag a write request to indicate a functional designation of a payload of the write request, in accordance with some embodiments of the present disclosure.

FIG. 4 is a flow diagram of an example method 400, implemented by the host system, to tag a write request to indicate a functional designation of a payload, in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the data allocation device mapper 220 of FIG. 2. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 410, the processing logic receives, from a filesystem, a write request including a payload. The write request can also include a logical address at which the payload is to be written. The write request can alternatively be received from a key-value store or other application. At operation 420, the processing device determines, using a data structure associated with the file system (or key-value store), a functional designation (or other characteristic) of the payload. The data structure associated with the application can be system tables that describe the payload. For example, the filesystem system tables can describe whether the payload is for data or metadata. As another example, in the key-value store example, a key-value store system table can describe whether the payload is for a key or for a value. The data structure associated with the application is not limited to these examples.

At operation 430, the processing logic associates, with the write request, a tag reflecting the functional designation (or other characteristic) of the payload. The functional designation of the data in the payload, such as whether the data in the payload represents metadata or data, or a key or a value. Another characteristic of the payload can alternatively, or additionally, represent an expected frequency of updates of data that is in the payload. In one embodiment, the tag associated with the write request can be part of a driver stack. For example, as described above, the tag can be the StreamID in a Linux driver stack.

At operation 440, the processing logic issues a write command to a memory sub-system. The write command includes the payload and the tag, and can also include a logical address received in the write command. The memory sub-system can be an SSD, as described above. The memory sub-system can include one or more single-level or triple-level cell storage device types, and one or more quad-level cell storage device types, for example.

Figure 5:
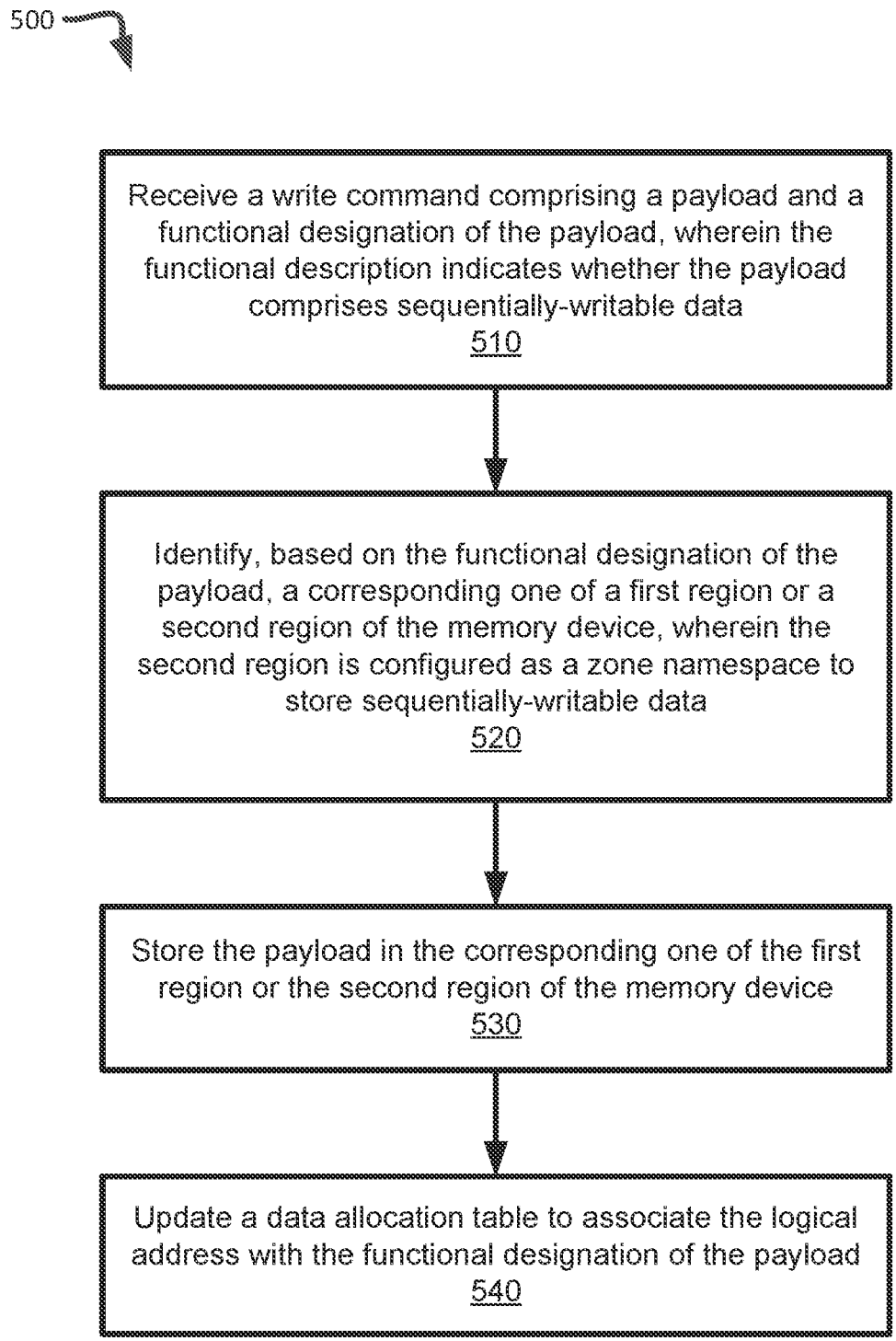
FIGS. 5 and 6 are flow diagrams an example methods to execute a tagged write command to write the payload to the appropriate memory region, in accordance with some embodiments of the present disclosure.

FIG. 5 is a flow diagram of an example method 500, implemented by the memory sub-system controller, to execute a tagged write command to write the payload to the appropriate memory region, in accordance with some embodiments of the present disclosure. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by the memory region manager 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 510, the processing logic receives a write command including a payload and a functional designation (or other characteristic) of the payload. The functional designation of the data in the payload can indicate whether the data in the payload represents metadata or data in a filesystem, or a key or a value of a key-value pair. The functional designation can also be understood as indicating whether the payload includes sequentially-writable data. Another characteristic of the payload can alternatively, or additionally, represent an expected frequency of updates of data in the payload. The write command can also include a logical address at which the payload is to be written.

At operation 520, the processing logic identifies, based on the functional designation of the payload, a corresponding one of a first region or a second region of the memory device. The second region can be configured as a zone namespace to store sequentially-writable data. As described above with reference to FIG. 3, if the processing device determines that the functional designation of the data in the payload is metadata (or a key of a key-value pair), the processing device can identify the first region of the memory device for storing the payload. If the processing device determines that the functional designation of the payload is data (or a value of a key-value pair), the processing device can identify the second region of the memory device for storing the payload. At operation 530, the processing logic stores the payload in the identified corresponding first or second memory region of the memory device. At operation 540, the processing logic updates a data allocation table to associate the logical address with the functional designation of the payload (or other indication of the identified first or second memory region).

Figure 6:
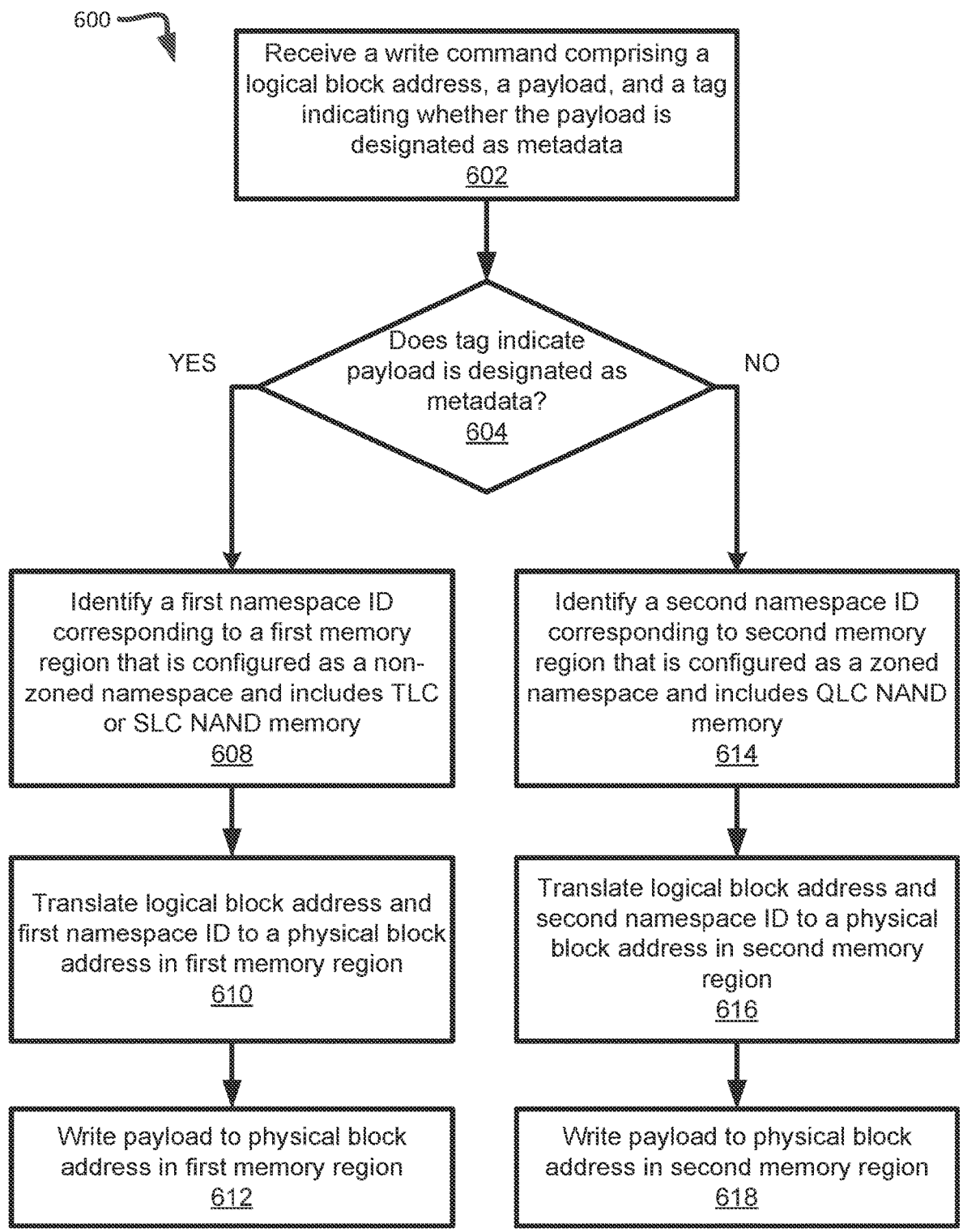

FIG. 6 is a flow diagram of an example method 600, implemented by the memory sub-system controller, to execute a tagged write command to write the payload to the appropriate memory region, in accordance with some embodiments of the present disclosure. The method 600 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 600 is performed by the memory region manager 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 602, the processing logic receives a write command including a logical block address, a payload, and a tag indicating whether the payload is designated as metadata. At operation 604, the processing device determines whether the tag indicates that the payload is designated as metadata. If so, then at operation 608, the processing device identifies a first namespace ID corresponding to a first memory region that is configured as a non-zoned namespace. The first memory region can include TLC or SLC NAND memory, for example. At operation 610, the processing device translates the logical block address and first namespace ID to a physical block address in the first memory region. At operation 612, the processing device writs the payload to the physical block address in the first memory region.

If operation 604 determines that the tag indicates that the payload is not designated as metadata, then at operation 614, the processing logic identifies a second namespace ID corresponding to a second memory region that is configured as a zoned namespace. The second memory region can include QLC NAND memory, for example. At operation 616, the processing device translates the logical block address and second namespace ID to a physical block address in the second memory region. At operation 618, the processing device writes the payload to the physical block address in the second memory region.

Figure 7:
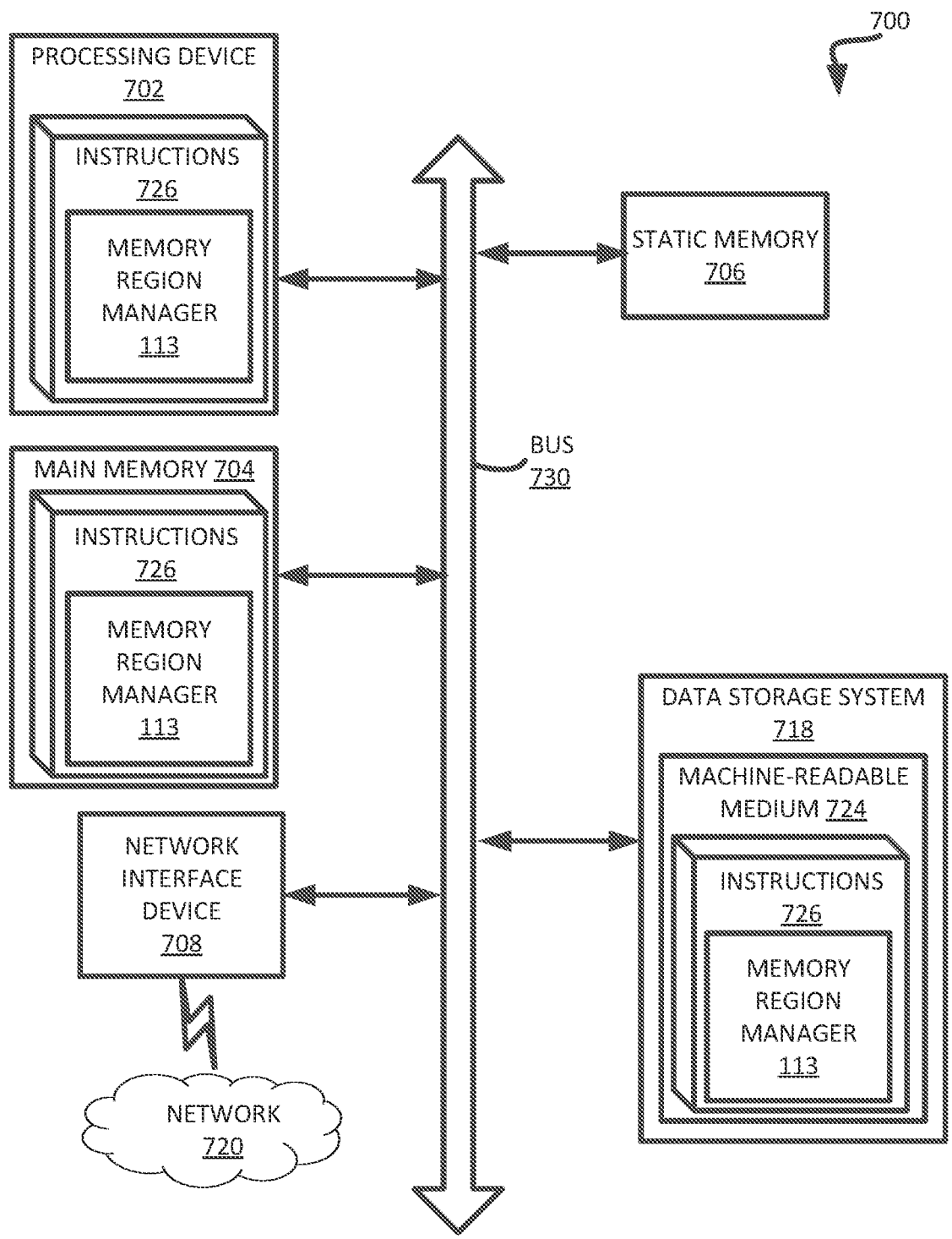
FIG. 7 is a block diagram of an example computer system in which embodiments of the present disclosure can operate.

FIG. 7 illustrates an example machine of a computer system 700 within which a set of instructions, for causing the machine to perform any one or more of the methodologies discussed herein, can be executed. In some embodiments, the computer system 700 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the memory region manager 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM) or RDRAM, etc.), a static memory 706 (e.g., flash memory, static random access memory (SRAM), etc.), and a data storage system 718, which communicate with each other via a bus 730.

Processing device 702 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 702 can also be one or more special-purpose processing devices such as an application specific integrated circuit (ASIC), a field programmable gate array (FPGA), a digital signal processor (DSP), network processor, or the like. The processing device 702 is configured to execute instructions 726 for performing the operations and steps discussed herein. The computer system 700 can further include a network interface device 708 to communicate over the network 720.

The data storage system 718 can include a machine-readable storage medium 724 (also known as a computer-readable medium) on which is stored one or more sets of instructions 726 or software embodying any one or more of the methodologies or functions described herein. The instructions 726 can also reside, completely or at least partially, within the main memory 704 and/or within the processing device 702 during execution thereof by the computer system 700, the main memory 704 and the processing device 702 also constituting machine-readable storage media. The machine-readable storage medium 724, data storage system 718, and/or main memory 704 can correspond to the memory sub-system 110 of FIG. 1.

In one embodiment, the instructions 726 include instructions to implement functionality corresponding to a memory device selection component (e.g., the memory region manager 113 of FIG. 1). While the machine-readable storage medium 724 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
a memory device; and
a processing device, operatively coupled with the memory device, to perform operations comprising:
receiving, from a host system, a write command comprising a payload and a functional designation of the payload, wherein the functional designation indicates whether the payload is designated as data or metadata;
identifying, based on the functional designation, a corresponding memory region of a first region or a second region of the memory device;
storing the payload at a physical address in the corresponding memory region;
storing, in a data allocation table, the functional designation in association with a logical address of the payload;
receiving a read comprising a second logical address;
identifying, using the allocation table, a second functional designation associated with the second logical address, and wherein the data allocation table associates the second logical address to the second functional designation;
identifying, based the on the second functional designation, a second corresponding memory region of the first region or the second region of the memory device, and
retrieving one or more blocks from the second corresponding memory region of the first region of the second region of the memory device.

2. The system of claim 1, wherein identifying the corresponding memory region comprises identifying the first region of the memory device based on that the functional designation indicates that the payload is designated as metadata, and identifying the second region of the memory device based on that the functional designation indicates that the payload is designated as data.

3. The system of claim 1, wherein storing the payload at the physical address in the corresponding memory region comprises storing the payload in the first region of the memory device responsive to that the functional designation indicates that the payload is designated as metadata, and storing the payload in the second region of the memory device responsive to that the functional designation indicates that the payload is designated as data.

4. The system of claim 1, wherein the Cees command further comprises the logical address, the operations further comprise:
translating the logical address to the physical address in the corresponding memory region.

5. The system of claim 1, wherein the write command further comprises a tag reflecting an expected frequency of data updates, and wherein the corresponding memory region is identified based on the tag.

6. The system of claim 1, wherein the payload comprises random-access write data responsive to that the functional designation indicates that the payload is designated as metadata.

7. The system of claim 1, wherein the payload comprises sequential write data responsive to that the functional designation indicates that the payload is designated as data.

8. The system of claim 1, wherein the first region comprises at least one of triple-level cell (TLC) memory or single-level cell (SLC) memory, and wherein the second region comprises quad-level cell (QLC) memory.

9. The system of claim 1, wherein the payload is received from a file system of the host system, and wherein the file system comprises a Shingled Magnetic Recording (SMR) file system.

10. A method comprising:
receiving, by a processing device, from a host system, a write command comprising a payload and a functional designation of the payload, wherein the functional designation indicates whether the payload is designated as data or metadata;
identifying, based on the functional designation, a corresponding memory region of a first region or a second region of a memory device;
storing the payload at a physical address in the corresponding memory region;
storing, in a data allocation table, the functional designation in association with a logical address of the payload,
receiving a read command comprising a second logical address;
identifying, using the data allocation table, a second functional designation associated with the second logical address, and wherein the data allocation table associates the second logical address to the second functional designation,
identifying, based on the second functional designation, a second corresponding memory region of the first region or the second region of the memory device; and
retrieving one or more blocks from the second corresponding memory region of the first region of the second region of the memory device.

11. The method of claim 10, further comprising:
responsive to determining that the functional designation indicates the payload is designated as metadata, identifying a first namespace identifier corresponding to the first region of the memory device, wherein the first region is configured as a non-zoned namespace, and wherein the write command further comprises a logical block address;
translating the logical block address and the first namespace identifier to a physical block address in the first region of the memory device; and
writing the payload to the physical block address in the first region of the memory device.

12. The method of claim 10, further comprising:
responsive to determining that the functional designation indicates the payload is designated as data, identifying a second namespace identifier corresponding to the second region of the memory device, wherein the second region is configured as a zoned namespace, and wherein the write command further comprises a logical block address;
translating the logical block address and the second namespace identifier to a physical block address in the second region of the memory device; and
writing the payload to the physical block address in the second region of the memory device.

13. The method of claim 10, wherein the payload comprises sequential write data responsive to that the functional designation indicates that the payload is designated as data.

14. The method of claim 10, wherein the first region comprises at least one of triple-level cell (TLC) memory or single-level cell (SLC) memory, and wherein the second region comprises quad-level cell (QLC) memory.

15. The method of claim 10, wherein the payload comprises random-access write data responsive to that the functional designation indicates that the payload is designated as metadata.

16. A non-transitory computer-readable storage medium comprising instructions that, when executed by a processing device, cause the processing device to perform operations comprising:
receiving, from a host system, a write command comprising a payload and a functional designation of the payload, wherein the functional designation indicates whether the payload is designated as data or metadata;
identifying, based on the functional designation, a corresponding memory region of a first region or a second region of a memory device;
storing the payload at a physical address in the corresponding memory region;
storing, in a data allocation table, the functional designation in association with a logical address of the payload;
receiving a read command comprising a second logical address,
identifying, using the data allocation table, a second functional designation associated with the second logical address, and wherein the data allocation table associates the second logical address to the second functional designation;
identifying based on the second functional designation, a second corresponding memory region of the first region or the second region of the memory device; and
retrieving one or more blocks from the second corresponding memory region of the first region or the second region of the memory device.

17. The non-transitory computer-readable storage medium of claim 16, wherein identifying the corresponding memory region comprises identifying the first region of the memory device based on that the functional designation indicates that the payload is designated as metadata, and identifying the second region of the memory device based on that the functional designation indicates that the payload is designated as data.

18. The non-transitory computer-readable storage medium of claim 16, wherein storing the payload at the physical address in the corresponding memory region comprises storing the payload in the first region of the memory device responsive to that the functional designation indicates that the payload is designated as metadata, and storing the payload in the second region of the memory device responsive to that the functional designation indicates that the payload is designated as data.

19. The non-transitory computer-readable storage medium of claim 16, wherein the first region comprises at least one of triple-level cell (TLC) memory or single-level cell (SLC) memory, and wherein the second region comprises quad-level cell (QLC) memory.

20. The non-transitory computer-readable storage medium of claim 16, wherein the write command further comprises the logical address, the operations further comprise:
translating the logical address to the physical address in the corresponding memory region.

* * * * *